Aug. 24, 1943. J. TJAARDA 2,327,470
ENGINE
Filed Nov. 29, 1940 2 Sheets-Sheet 1
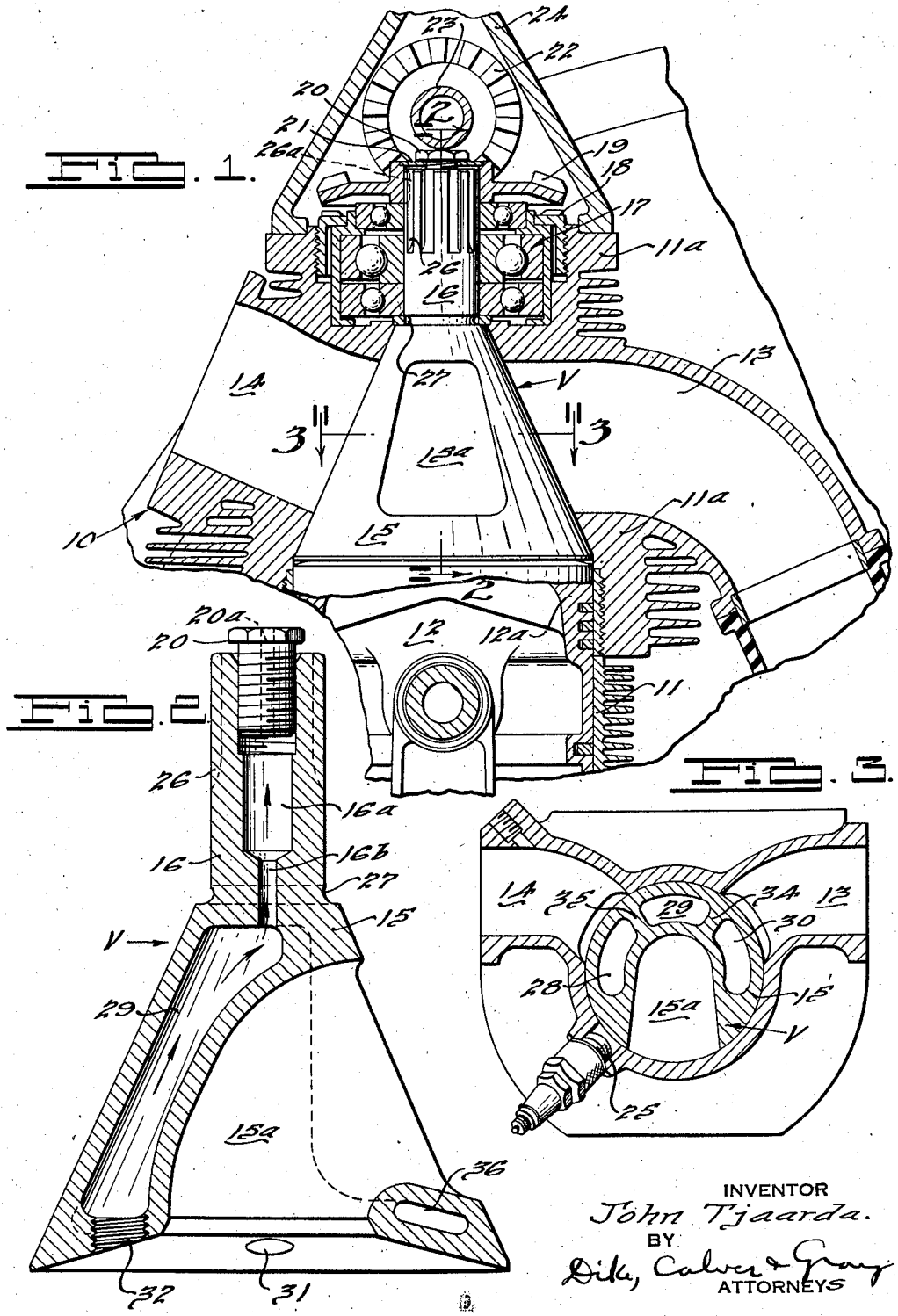
INVENTOR
John Tjaarda.
BY
Dike, Calver & Gray
ATTORNEYS Aug. 24, 1943.  J. TJAARDA  2,327,470
ENGINE
Filed Nov. 29, 1940  2 Sheets-Sheet 2
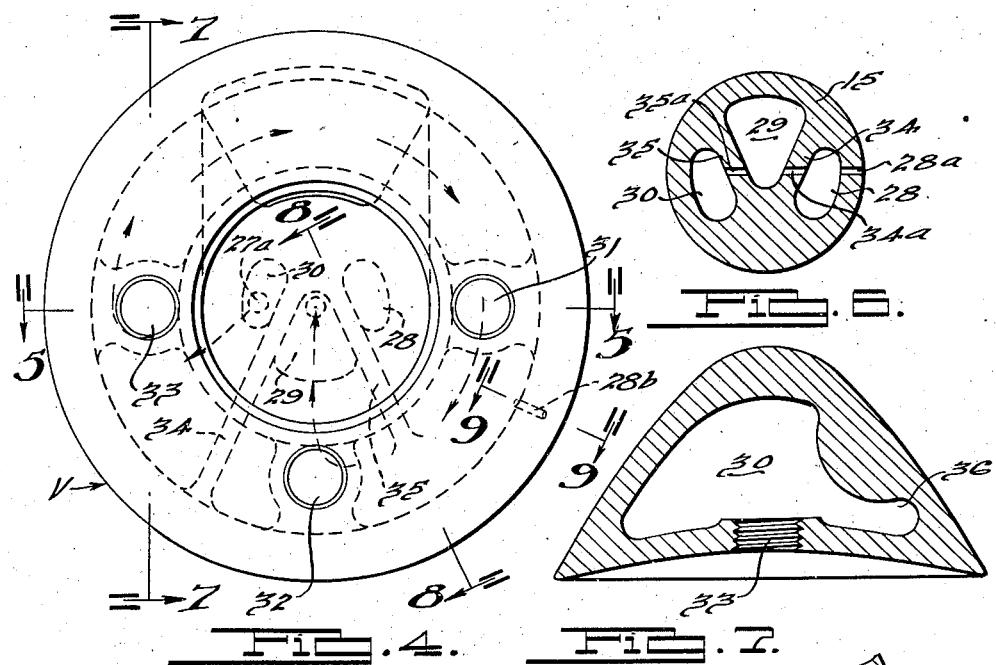
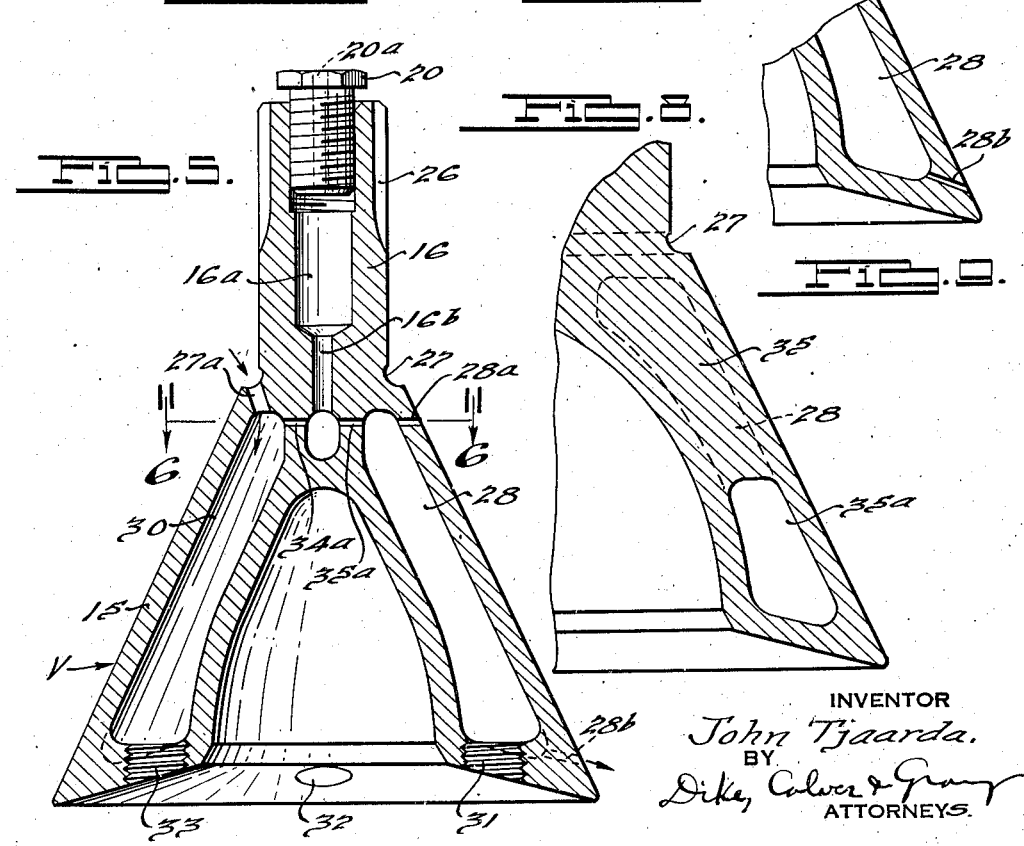
INVENTOR
John Tjaarda.
BY
Dike, Colver & Gray
ATTORNEYS.

Patented Aug. 24, 1943

2,327,470

UNITED STATES PATENT OFFICE 2,327,470

ENGINE

John Tjaarda, Detroit, Mich., assignor to Briggs Manufacturing Company, Detroit, Mich., a corporation of Michigan Application November 29, 1940, Serial No. 367,705

17 Claims. (Cl. 123—190)

This invention relates to internal combustion engines and is directed more particularly to liquid cooled and lubricated rotary valves for such engines.

In the construction of internal combustion engines, in an effort to increase the power efficiency, an important development has been the increase in the rate of propagation of combustion of gas by means of increasing the compression ratio of the engine. This increased compression ratio has been attained in one form of engine by the use of a rotary type valve having a compression and combustion space within itself and timed for communication with coacting intake, ignition and exhaust ports located upon the body of the cylinder. In its present form the rotary type valve while inherently advantageous in the development of higher compression ratios and increased power is limited in its efficiency due to difficulties encountered in respect to cooling and lubrication at high rotating speeds.

It is well known that an overheated valve will have a tendency to preignite the combustible mixture thereby effecting a considerable loss of engine power. Furthermore, at high rotating speeds a lack of sufficient lubrication will cause the valve to adhere to the surfaces of the cylinder head causing a scoring of the cooperating parts and thus limit the efficiency of the engine.

It is an important object of the invention to provide an engine having a rotary valve of the foregoing type so constructed as to provide an adequate circulation of cooling liquid over its entire surfaces and thus uniformly cool all the valve parts.

It is another object of the invention to provide an engine having a rotary valve of the foregoing type so constructed as to provide an adequate circulation of cooling liquid over its entire surfaces and thus uniformly cool all the valve parts, said cooling fluid being induced into the valve by means of pressure, the flow of which is regulated by suitable metering devices whereby the necessary cooling circulation is obtained.

It is another object of the invention to provide a rotary valve so constructed as to induce a flow of lubricating fluid through the valve walls from its inner to its outer surfaces, said flow being controlled by means of small holes or ports placed at desirable intervals on the valve surfaces.

It is still another object of the invention to provide a rotary valve so constructed as to induce a flow of lubricating fluid through the valve walls from its inner to its outer surfaces, said flow being enhanced by the centrifugal force set up inside the valve by the rotating body of cooling and lubricating fluid.

Still a further object is to provide a valve of the rotary type comprising a relatively light alloy of metal and so constructed as to be light in weight, resistant to distortion and by distribution of metal substantially perfect in rotary balance.

Other objects of this invention will appear in the following description and appended claims, reference being had to the accompanying drawings forming a part of this specification wherein like reference characters designate corresponding parts in the several views.

Fig. 1 is a sectional view of an engine cylinder equipped with a rotary valve embodying the present invention.

Fig. 2 is a sectional view taken substantially through lines 2—2 of Fig. 1, looking in the direction of the arrows.

Fig. 3 is a sectional view taken substantially through lines 3—3 of Fig. 1, looking in the direction of the arrows.

Fig. 4 is an enlarged bottom plan view of the rotary valve as shown in Fig. 1.

Fig. 5 is a sectional view taken substantially through the lines 5—5 of Fig. 4, looking in the direction of the arrows.

Fig. 6 is a sectional view taken substantially through the lines 6—6 of Fig. 5, looking in the direction of the arrows.

Fig. 7 is a sectional view taken through lines 7—7 of Fig. 4, looking in the direction of the arrows.

Fig. 8 is a sectional view taken substantially through lines 8—8 of Fig. 4, looking in the direction of the arrows.

Fig. 9 is a sectional view taken substantially through lines 9—9 of Fig. 4, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularly to Fig. 1, there is shown for the purpose of illustrating the invention, a section of an internal combustion engine cylinder. This cylinder, generally designated as 10, comprises a barrel portion 11 and a head portion 11a suitably connected thereto. The barrel 11 is provided with a piston 12 operably connected to a crankshaft (not shown). A supply of combustible mixture is supplied to the cylinder through the medium of a riser 13. It will be noted that the supply of the mixture is from the inner side of the cylinder outwardly toward the cylinder and that the exhaust gases are permitted to escape through exhaust port 14, see Fig. 1, located at the outer side of the cylinder.

In the present instance the intake of the combustible mixture into the cylinder, also the scavenging and exhaust of the products of combustion, are controlled by a valve mechanism generally designated as V positioned in the outer extremity of the cylinder. The intake passage 13 of the cylinder and the exhaust passage 14 communicate with inlet and outlet ports mounted in the cylinder head. The rotary cone valve V shown in Fig. 1 has an outwardly converging valve skirt 15 integrally attached to an outwardly projecting stem or stub shaft 16 journalled through suitable bearing races 17 which are preloaded by tightening the bearing nut 18. The shaft 16 is secured to a bevel gear 19 by means of a hollow bolt 20 and washer 21. The gear 19 is in mesh with a gear 22 secured to a valve driving shaft 23. The valve actuating shaft 23 together with gear 19 operates in a longitudinally extending housing 24. The shaft 23 is preferably hollow to minimize weight and to permit the flow of oil therethrough for lubricating purposes. The inner face of the rotary cone valve 15 is concave to cooperate with the complementary convex head 12a of the piston, the valve having an interior dome-like combustion chamber 15a with which the intake and exhaust passages 13 and 14 communicate at intervals during the rotation of the valve. The spark plug 25 for the cylinder also communicates through a port with the combustion chamber 15a at predetermined intervals during the rotation of the valve for the purpose of firing the compressed mixture.

Referring particularly to Figs. 2 and 5, there is shown, by way of illustration, a rotary cone type valve embodying the present invention and generally designated as V in Fig. 1. This valve consists of a casting of any suitable metal having a relatively low coefficient of expansion such, for example, as an aluminum alloy and comprises the flared skirt-like portion 15 which converges outwardly into a cylindrically shaped stub or stem extension 16 which is provided along its outer end with a series of longitudinal splines or grooves 26 which are adapted to mesh with keys or tongues 26a of the ring gear 19. Formed upon the periphery of the valve substantially at the juncture of said skirt 15 and stem 16 is an annular groove 27 adapted to receive a cooling and lubricating medium which may be any liquid with combined qualities suitable for cooling and lubrication of which, in the present instance, oil is preferred. The skirt portion 15, as best shown in Figs. 2, 3 and 6, comprises a plurality of outwardly converging oil circulating chambers 28, 29 and 30. These chambers, formed in the valve skirt by the insertion of an interior core (not shown) in the casting process, are sealed upon removal of the core by plugs 31, 32 and 33 as shown in Fig. 5 which are subsequently machined off to provide the effect of a solid wall upon the lower or inner end face of the valve. By constructing the cone chambers in this manner it is possible to remove all excess metal and therefore make the cone light as is practicable. Such construction furthermore makes possible the provision of dividing ribs 34 and 35 which not only serve as baffle plates to aid the circulation of the oil within the chambers when the valve is rotating but serve as supporting valve segments located at suitable intervals within the valve and, as such, resist the possibility of valve distortion. By this construction a distribution of metal is also provided which results in a valve of perfect rotary balance.

The chambers 28, 29 and 30 are interconnected both at their outer or upper converging portions and at their inner extremities to provide a means for the proper circulation of oil necessary to provide equal cooling to all parts of the valve surface. Ducts 34a and 35a are drilled through the dividing ribs 34 and 35, see Figs. 5 and 6, at the converging portions of the chambers for this purpose. The oil passage 36 shown in Figs. 2 and 7 and rib opening 35a shown in Fig. 8 serve as a means of interconnecting the said chambers at their lower extremities. For the purpose of permitting an induction of oil into the chambers from the gear housing 24, chamber 30 is connected to the annular oil receiving groove 27 by means of an oil induction duct or conduit 27a. To permit the flow of oil out of the oil circulating chambers, an oil outlet passage 16a formed along the axis of valve stem 16, is connected to chamber 29 by means of a conduit 16b and in communication with the gear housing 24 by means of a drilled hole 20a through the axis of the bolt 20.

In the operation of the valve, see Figs. 2, 4 and 5, the oil flows under the pressure of a suitable oil pump (not shown) into the bearing and gear housing 24, through the bearing races 17 into the annular oil receiving groove 27. At this point the oil is forced into the valve chamber 30 through the induction conduit 27a. From chamber 30 the oil flows through the passage or flat elongated cavity 36 into chamber 28 from which area it seeks a passage through rib opening 35a into chamber 29 where it contacts the flat surfaces of rib or wall 34 which serves as a baffle plate thus directing the oil upward through chamber or cavity 29 and thence through conduit 16b into the oil outlet passage 16a, thence through the drilled hole 20a of the bolt 20 into the gear housing 24 from which point it returns to the pump for cooling and recirculating.

It should be noted in the circulation of the oil within the valve chambers that oil conduits 34a and 35a are important equalizing factors in preventing the possibility of the formation of back pressure or of oil pockets within the chambers wherein the oil might stagnate, become overheated and in consequence effect an unequal cooling of the valve surfaces. The said conduits assist the circulation of oil within the chambers in the following manner: As the oil in chamber 30 rushes from the inlet conduit 27a past the opening of conduit 34a, a portion of the oil is drawn through the conduit from chamber 29 into chamber 30. To further assist this action a portion of the oil as it surges up through chamber 29 is forced through both conduits 34a and 35a into the chambers 28 and 30. Thus, a continuous circulation of oil to all parts of the valve is assured. The circulation of the oil is greatly enhanced by the centrifugal movement of the body of oil within the valve chambers. This centrifugal force is also used to force the oil through a plurality of lubricating conduits 28a and 28b located at desired points on the valve surface, connecting the valve chambers with the outer surface of the valve and thus lubricating the valve while it is rotating. Regulation of the flow of oil into the valve to maintain a rate of flow necessary for cooling purposes may be attained by increasing or decreasing the size of the outlet conduit 16b and by a variation of the inlet pressure on the oil forced into conduit 27a.

I claim:

1. In an internal combustion engine of the type having a cylinder and a reciprocating piston therein, a rotary valve member adapted to be mounted on the head-end of the cylinder and comprising a valve skirt having a valve stem projecting therefrom, said valve skirt having a plurality of connecting chambers formed therein and separated at least in part by walls formed integrally from the skirt, said chambers adapted to receive a cooling liquid, and means for inducing a flow of cooling liquid within the said chambers and from one chamber to another.

2. In an internal combustion engine, a rotary valve having a valve skirt and a valve stem projecting therefrom, said skirt having a plurality of connecting chambers formed therein and adapted to receive a cooling liquid, said chambers being separated at least in part by walls formed integrally from the skirt, and means whereby the cooling liquid may be circulated within the said chambers.

3. A rotary valve comprising a valve skirt and a hollow valve stem projecting therefrom, said valve skirt having a plurality of connecting chambers formed therein with connecting passage through said stem, said chambers adapted to receive a cooling liquid and being separated at least in part by walls formed integrally with the skirt, and means for circulating the cooling liquid in said casing through said chambers and valve stem.

4. A rotary valve comprising a valve skirt and a hollow valve stem integrally projecting therefrom, said valve skirt having a plurality of connecting chambers formed therein with connecting passage through said stem, said chambers adapted to receive a cooling liquid and being separated at least in part by walls formed integrally with the skirt, and means for circulating the cooling liquid in said casing through said chambers and valve stem and for inducing a flow of the liquid from one chamber to another.

5. In an internal combustion engine, a conical shaped rotary valve having a hollow valve stem projecting therefrom, said valve having a plurality of connection and converging chambers formed therein with connecting passage through said valve stem, said chambers being separated at least in part by partition walls formed integrally with the valve, said chambers adapted to receive a cooling liquid, and means for circulating the cooling liquid in said casing through said chambers and valve stem.

6. A rotary valve for an engine comprising a valve body having a projecting valve stem provided with a discharge passage extending into a valve skirt having a plurality of connecting chambers formed therein with connecting passage through said stem, said chambers being separated at least in part by partition walls formed integrally with the skirt, said chambers being provided with an inlet passage, and a means for circulating a cooling liquid through said inlet passage to the valve chambers and out said discharge passage.

7. A rotary valve comprising a valve skirt having a valve stem projecting therefrom, said valve skirt having internally formed connecting chambers, said chambers being provided with a plurality of outlet passages connecting said chambers with the outer surface of the valve skirt, said chambers being separated at least in part by partition walls formed integrally with the skirt, and means for producing circulation of a cooling fluid within the said chambers and to the outer surface of the valve skirt.

8. A rotary valve for an engine comprising a valve skirt having a valve stem projecting therefrom, said valve skirt having internally formed connecting chambers separated at least in part by partition walls formed integrally with the skirt, said chambers being provided with a plurality of outlet passages connecting said chambers with the outer surface of the valve skirt, an inlet for oil to said chambers, means for inducing circulation of the oil within the said chambers and to the outer surface of the valve skirt, and means for rotating said valve whereby oil will be forced through said outlet passages by centrifugal action.

9. A rotary valve having a combustion chamber, the walls of said combustion chamber having passages separated by rib means, and means for directing a cooling liquid through said passages from one to another.

10. A rotary valve having a combustion chamber, the walls of said combustion chamber having connecting passages separated by a plurality of internal walls separated by an internal wall or walls for the flow therethrough of a lubricating oil, and separate inlet and outlet ports common to said passages, 11. A rotary valve having a combustion chamber, the walls of said combustion chamber having passages separated by internal walls for the flow therethrough of a lubricating oil, and separate inlet and outlet ports common to said passages, and means for directing oil from said passages to the outer surface of the valve.

12. A rotary valve provided with a combustion space and at least partially surrounding walls cored to provide connecting chambers separated by ribs.

13. A generally conical rotary valve provided with a combustion space and at least partially surrounding walls cored to provide chambers separated by ribs.

14. A rotary valve provided with a combustion space and at least partially surrounding walls cored to provide chambers separated by ribs, and inlet and outlet ports permitting a flow of liquid into and out of said chambers.

15. In an internal combustion engine having a cylinder and a reciprocable piston therein, a rotary valve provided with a combustion space and at least partially surrounding walls cored to provide chambers separated by ribs, passages connecting said chambers and means for introducing cooling liquid into said chambers and inducing a flow of the liquid from one chamber to the other.

16. A rotary generally conical valve having a combustion chamber and an axially extending stem, the walls of said combustion chamber having a cooling chamber extending around said combustion chamber, a duct for lubricating oil extending through an outer wall of the valve into the cooling chamber, and a duct for said oil extending axially from said cooling chamber through the stem.

17. A rotary generally conical valve having a combustion chamber and an axially extending stem, the walls of said combustion chamber having a cooling chamber extending around said combustion chamber, a duct for lubricating oil extending through an outer wall of the valve into the cooling chamber, a duct for said oil extending axially from said cooling chamber through the stem, and means for directing oil through said first named duct and said cooling chamber and thence through said second named duct.

JOHN TJAARDA.

CERTIFICATE OF CORRECTION.

Patent No. 2,327,470.　　　　　　　　　　　　　August 24, 1943.

JOHN TJAARDA.

It is hereby certified that error appears in the printed specification of the above numbered patent requiring correction as follows: Page 3, second column, lines 36 and 37, claim 10, after the word "walls" strike out "separated by an internal wall or walls"; and that the said Letters Patent should be read with this correction therein that the same may conform to the record of the case in the Patent Office.

Signed and sealed this 26th day of October, A. D. 1943.

(Seal)

Henry Van Arsdale,
Acting Commissioner of Patents.